United States Patent
Schernthaner (10) Patent No.: US 9,109,747 B2
(45) Date of Patent: Aug. 18, 2015

(54) MODULAR CERAMIC GUIDEWAY MEMBER

(71) Applicant: Carl Zeiss Industrial Metrology, LLC, Maple Grove, MN (US)

(72) Inventor: Josef Schernthaner, Maple Grove, MN (US)

(73) Assignee: Carl Zeiss Industrial Metrology, LLC, Maple Grove, MN (US)

( * ) Notice: Subject to any disclaimer, the term of this patent is extended or adjusted under 35 U.S.C. 154(b) by 0 days.

(21) Appl. No.: 13/935,048

(22) Filed: Jul. 3, 2013

(65) Prior Publication Data

US 2013/0292544 A1 Nov. 7, 2013

Related U.S. Application Data

(63) Continuation of application No. PCT/US2011/021802, filed on Jan. 29, 2011.

(51) Int. Cl.

| G01B 5/008 | (2006.01) |
|---|---|
| F16M 11/20 | (2006.01) |
| B23Q 1/26 | (2006.01) |
| G01B 1/00 | (2006.01) |
| G01B 5/00 | (2006.01) |
| F16C 29/00 | (2006.01) |

(52) U.S. Cl.
CPC ............ *F16M 11/2092* (2013.01); *B23Q 1/26* (2013.01); *F16C 29/005* (2013.01); *F16M 11/2085* (2013.01); *G01B 1/00* (2013.01); *G01B 5/0009* (2013.01)

(58) Field of Classification Search
CPC ...... G01B 21/042; G01B 5/008; G01B 11/03; G01B 1/00; G01B 3/30; G01B 5/0014; G01B 7/008; G01B 11/007; G01B 11/245

USPC .................................. 33/503, 556, 559, 1 M
See application file for complete search history.

(56) References Cited

U.S. PATENT DOCUMENTS

| 4,763,420 | A | * | 8/1988 | McCabe et al. ................ 33/503 |
| 4,812,057 | A | | 3/1989 | Kuhn et al. |
| 5,058,433 | A | * | 10/1991 | Wilson et al. .................. 33/503 |

(Continued)

FOREIGN PATENT DOCUMENTS

| DE | 10 2006022501 | 11/2007 |
| EP | 1 500 903 | 1/2005 |

OTHER PUBLICATIONS

Machine translation of DE102006022501.*

(Continued)

*Primary Examiner* — Yaritza Guadalupe-McCall
(74) *Attorney, Agent, or Firm* — Fish & Richardson P.C.

(57) ABSTRACT

A linear motion machine includes a base having an upper surface configured to support one or more work pieces and an instrument movably mounted to the base via a plurality of guideways permitting movement of the instrument relative to the base along three axes. At least one of the pluralities of guideways includes an elongated guideway member made of a plurality of elongated generally planar web members. Each of the elongated generally planar web members has a length and a pair of opposite side edges running along the length. The plurality of elongated generally planar web members are bonded together at least at one or more of the side edges to form the elongated guideway member. The elongated guideway member includes a ceramic material.

12 Claims, 8 Drawing Sheets

(56) References Cited

U.S. PATENT DOCUMENTS

| | | | |
|---|---|---|---|
| 5,583,443 A * | 12/1996 | McMurtry et al. | 324/601 |
| 6,202,316 B1 * | 3/2001 | Swift et al. | 33/503 |
| 7,591,078 B2 * | 9/2009 | Crampton | 33/503 |
| 2013/0167390 A1 * | 7/2013 | Tarizzo | 33/503 |
| 2013/0292544 A1 * | 11/2013 | Schernthaner | 248/661 |

OTHER PUBLICATIONS

International Search Report for corresponding Appl No. PCT/US2011/021802, dated Apr. 4, 2011.

* cited by examiner

MODULAR CERAMIC GUIDEWAY MEMBER

CROSS-REFERENCE TO RELATED APPLICATIONS

The present application is a continuation of, and claims benefit under 35 USC 120 to, international application PCT/US2011/021802, filed Jan. 20, 2011. The entire disclosure of international application PCT/US2011/021802 is incorporated by reference herein.

TECHNICAL FIELD

This document relates to modular ceramic guideway members including a plurality of elongated flat panel members bonded at side edges.

BACKGROUND

Linear motion machines can be used for a number of different industrial operations in which work pieces are manipulated or measured. Linear motion machines can be configured to allow for motion along three linear axes. A linear motion machine can include a plurality of guideways that define each axis. Linear motion machines include, for example, bridge machines, gantry-type machines, and cantilevered machines. A bridge machine, for instance, generally includes a base, a bridge movably mounted to the base, and a carriage movably mounted to the bridge. An instrument can be movably mounted to the carriage and be used to measure or manipulate one or more work pieces placed and/or secured to the base. For example, a linear motion machine can be used to shape material. A cutting tool can be used to selectively remove material (e.g., metal or plastic) from a preformed body. Linear motion machines can also be used for assembling parts. For example, flat screen televisions and other electronic devices can be assembled by pick-and-place machines. Moreover, linear motion coordinate measuring machines can be used to measure the dimensions of various work pieces. Linear motion screen printing machines can be used for certain printing operations. Linear motion machines can also have high resolution measuring systems, electrical contact probes, motor drives, computer controlled drives, and computer acquisition and processing of data.

It is often desirable for linear motion machines to be accurate and precise. For example, it is often desirable for machine tools to be accurate and precise in order to repeatedly create articles to exact specifications. Pick-and-place machines with improved accuracy and precision can permit assembly of more compact and complex arrangements of various components. Coordinate measuring machines are used for dimensional inspection of work pieces such as machine parts and thus must be very accurate and precise in order to determine whether each work piece fits within a desired specification.

The accuracy of a linear motion machine can be limited by inaccuracies in the scales or other measuring systems and/or by faults in guideways that establish orthogonality of machine motions. For example, the bridge of a bridge machine may act as one of the guideways of a bridge machine. One approach to increasing accuracy is to improve the construction techniques and reduce tolerances of the system so that errors are reduced. Another approach is direct measurement of x, y and z errors at points throughout the linear motion machine working volume to permit correction of those errors. This approach, however, can be time consuming and data intensive. A third approach is to utilize measurements of errors in parametric form. That is, sets of error parameters are measured, for example, along three mutually orthogonal axes and stored for future use. The x, y and z errors at any point in the machine working volume are calculated from the parametric errors. For a coordinate measuring machine, the calculated errors are then subtracted from the scale readings to determine actual work piece coordinates. For a machine tool or pick-and-place machine, the parametric errors can be used to dynamically adjust the instrument relative to the base.

Significant errors can also be introduced because of environmental temperature changes. Environmental temperature causing significant expansion or contraction of different portions of linear motion machines can introduce noticeable errors into measurements and/or manipulations of work pieces. The expansion or contraction of a material due to a temperature change is described by a material's coefficient of thermal expansion (CTE). Numerical methods can be used to attempt to correct for environmental temperature changes based on the different CTEs of the different materials used in the linear motion machine. Numerical methods are not perfect; they can be limited due to non-instantaneous changes in the temperatures of the linear motion machine components. During a change in environmental temperature, each component can take time to cool or heat to the environmental temperature throughout its entire structure, and thus the components will continue to expand or contract until equilibrium is established. Therefore, selecting low CTE materials can minimize error associated with using the linear motion machine in a non-temperature controlled environment. Having a low CTE, however, is not the only criteria for selecting the material for the guideways of the linear motion machine. The modulus of elasticity (i.e., the stiffness) of a material is also a consideration. For example, a low modulus of elasticity can result in flexing and vibration of the cross-beam guideway of a bridge member of a bridge machine as the carrier moves along the cross-beam, which can introduce error.

SUMMARY

A linear motion machine is described that features an elongated guideway member having a low CTE, low thermal inertia, and a high modulus of elasticity that provides high quality bearing tracks, is relatively lightweight and is not limited in size or configuration, yet can be produced at a moderate cost and on demand. A linear motion machine includes a base having an upper surface configured to support one or more work pieces and an instrument movably mounted to the base via a plurality of guideways permitting movement of the instrument relative to the base along three axes. At least one of the plurality of guideways includes an elongated guideway member made of a plurality of elongated generally planar web members. Each of the elongated generally planar web members has a length and a pair of opposite side edges running along the length. At least some of the elongated generally planar web members are bonded together at least at one or more of the side edges to form the elongated guideway member. One or more of the elongated generally planar web members includes a ceramic material.

The linear motion machine can be a bridge machine, a gantry-type machine, or a cantilevered machine. In some embodiments, the linear motion machine is a coordinate measuring machine. In other embodiments, the liner motion machine is a machine tool. The linear motion machine can also be a pick-and-place machine adapted to assemble parts.

The elongated guideway member can be configured for movement relative to the base. For example, the elongated guideway member can be a cross-beam of a bridge machine, gantry-type machine, or cantilevered machine and can be suspended via one or more uprights over the base and parallel to the base's upper surface. A carriage can be moveably mounted on the cross-beam and an instrument can be movably mounted to the carriage. In other embodiments, the elongated guideway member can be an upright extending orthogonal to the base's upper surface. In still other embodiments, the elongated guideway member is a guideway permitting the instrument to move along an axis orthogonal to the upper surface. In other embodiments, the elongated guideway member defines a base guideway fixedly attached to the base. In some embodiments, the linear motion machine includes multiple elongated guideway members each defining a guideway for movement along different axes and each comprising a plurality of elongated generally planar web members.

The elongated guideway member can have a rectangular cross-section including two pairs of parallel planar web members each bonded at opposite side edges. In some embodiments, the elongated guideway member includes at least one internal elongated generally planar web member positioned within the two pairs of parallel planar web members. In some embodiments, the elongated guideway member can include non-planar internal elements. For example, the elongated guideway member can include an internal elongated generally tubular member positioned within the two pairs of parallel planar web members.

A bond between the elongated generally planar web members can include an epoxy adhesive, an acrylic adhesive, or a soldering material. Some embodiments include a metal coating applied along an inside surface. In some embodiments, the metal coating can bond the plurality of elongated generally planar web members. Dovetailed connections can also be made between the elongated generally planar web members to further strengthen a bond.

One or more of the elongated generally planar web members can be formed of ceramic material. In some embodiments, one or more elongated generally planar web members consist essentially of a ceramic material (i.e., comprise at least 75 weight percent of ceramic material). In some embodiments, each of the elongated generally planar web members is formed of ceramic material. The ceramic material, for example, can be aluminum oxide, silicon carbide, silicon nitride, glass-like ceramics, or a combination thereof. In some embodiments, the ceramic material is isostatically pressed ceramic material. The ceramic material can be shaped, fired, and machined to form the elongated generally planar web members. In some embodiments, each elongated generally planar web member has a thickness of between 0.5 mm and 25 mm, a width of between 5 cm and 50 cm, and a length of between 50 cm and 500 cm.

In other embodiments, one or more of the elongated generally planar web members can include a non-ceramic material. In some embodiments, at least one elongated generally planar web member is formed of a metal (e.g., Invar®). In some embodiments, one or more elongated generally planar web members can include a carbon fiber. For example, one or more elongated generally planar web members could be formed of a polymer/carbon fiber composite.

In another aspect, a bridge machine is described that includes a base, a bridge, and a carriage. The base has an upper surface configured to support one or more work pieces. The bridge is positioned, at least in part, above the base and is configured to move relative to the base. The bridge includes at least one elongated guideway member. The elongated guideway member includes a plurality of elongated generally planar web members. Each of the elongated generally planar web members has a length and a pair of opposite side edges running along the length. The plurality of elongated generally planar web members is bonded together at least at one or more of the side edges. The elongated guideway member includes a ceramic material. The carriage is movably mounted to the bridge for movement relative to the bridge and to the base. The carriage includes an instrument configured to measure or manipulate items supported on the base.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
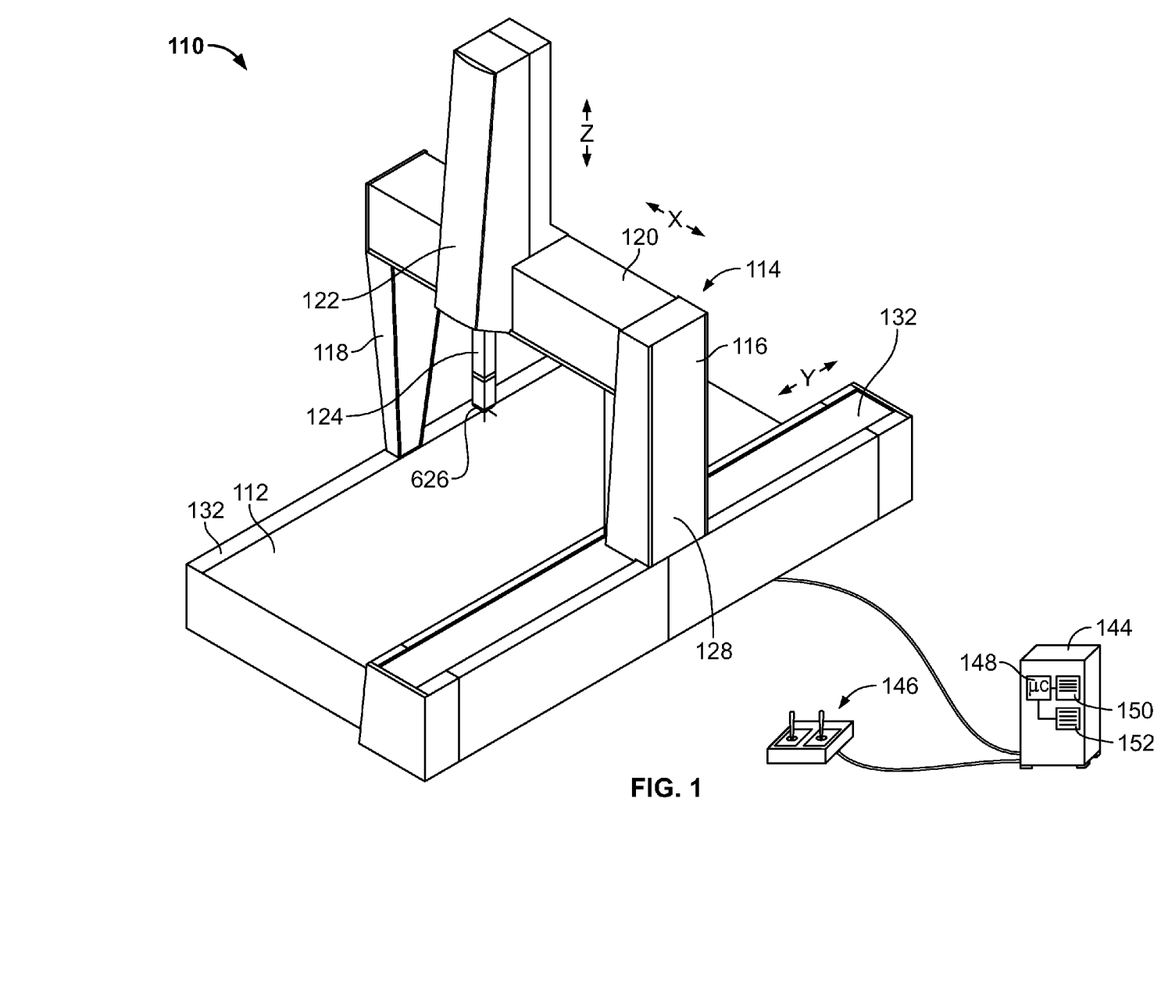
FIG. 1 shows a bridge machine.
Figure 2:
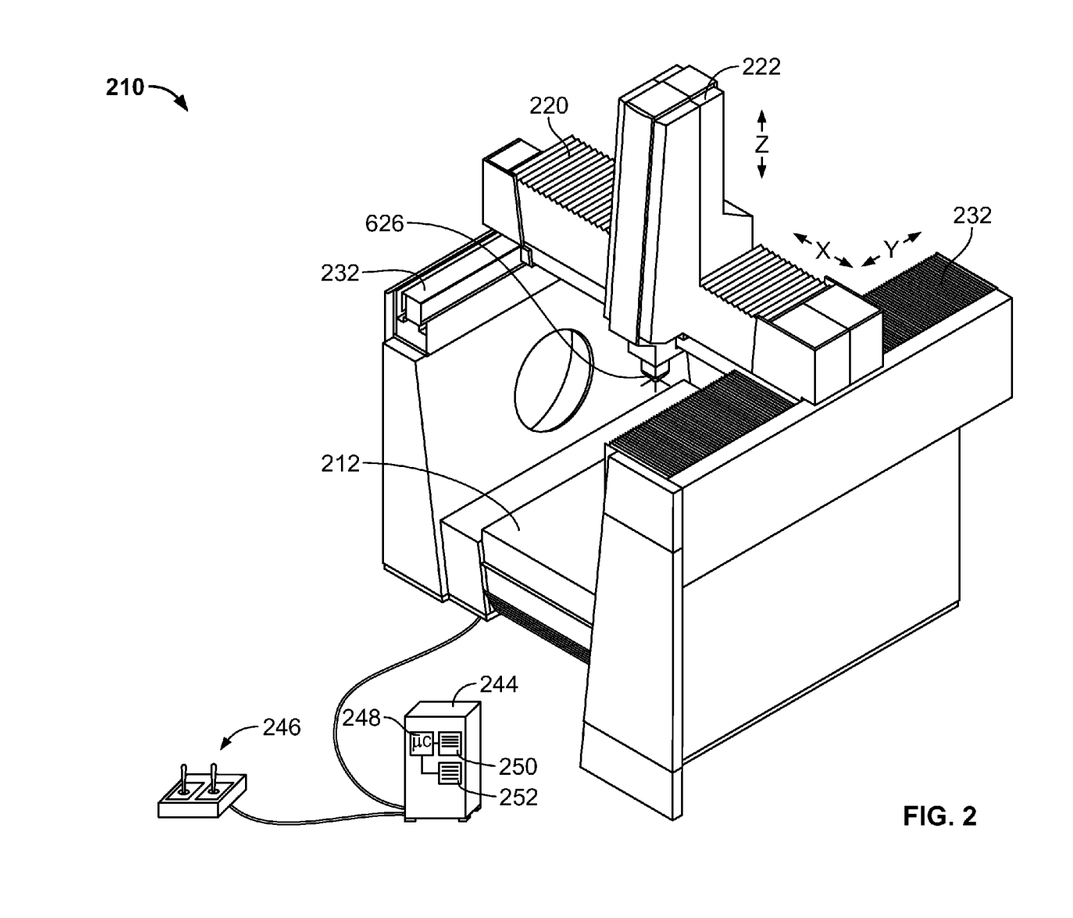
FIG. 2 shows a gantry-type machine.

Elongated guideway members can be used as a guideway, or part of a guideway, in a variety of linear motion machines. For example, one type of linear motion machine is the bridge machine 110 depicted in FIG. 1. FIG. 2 depicts a gantry-type linear motion machine 210. Other types of linear motion machines include cantilevered linear motion machines having a cantilevered cross-beam suspended via a single upright over the base parallel to the upper surface. Other types of linear motion machines are also contemplated. Referring to FIGS. 1 and 2, a linear motion machine can permit an instrument 626 to be move along three axes X, Y, and Z. As shown, the three space directions X, Y and Z are orthogonal to one another.

As shown in FIG. 1, a bridge machine 110 includes a base 112, a bridge 114 that is configured for movement along base guideways 132, and a carriage 122 movably mounted on cross-beam 120 for movement relative to the bridge 114 and to the base 112. The bridge 114 is arranged so that it can be displaced in a first direction (the Y direction). As shown, the bridge 114 has two uprights (more generally: supports) 116, 118, which are connected by cross-beam 120 at their respective other ends. As shown, the carriage 122 is displaced along the cross-beam 120 of the bridge, i.e. in a second direction (the X direction), thus cross-beam 120 is, at least in part, a guideway for the carriage 122. The carriage 122 can allow for motion of the instrument 626 in a third direction (the Z direction) perpendicular to the first and second space directions. For example, carriage 122 can include a ram 124 connected to the instrument 626, which can act as a guideway and can move along guideways defined by the carriage 122. In the embodiment shown in FIG. 1, upright 116 is driven by drive 128 and upright 118 follows idly. In other embodiments, both uprights 116, 118 can have their own drives. In still other embodiments, the bridge 114 can remain stationary and the base 112 can move in the Y direction.

As shown in FIG. 2, gantry-type linear motion machine 210 includes a base 212, a cross-beam 220 that is configured for movement relative to the base along elevated base guideways 232 (in the Y direction), and a carriage 222 movably mounted to the cross-beam 220 along for movement relative to the base 212 (in the X direction). The carriage 222 can also include one or more guideways and/or cooperate with guideways attached to the instrument 626 to allow for motion of the instrument 626 in a third direction (the Z direction). In some embodiments, cross-beam 220 is driven by a single drive along a first elevated base guideway 232. In other embodiments, both elevated base guideways 232 can have their own drives that allow movement of the cross-beam 220 in the Y direction.

Figures 3A, 3B, 3C:
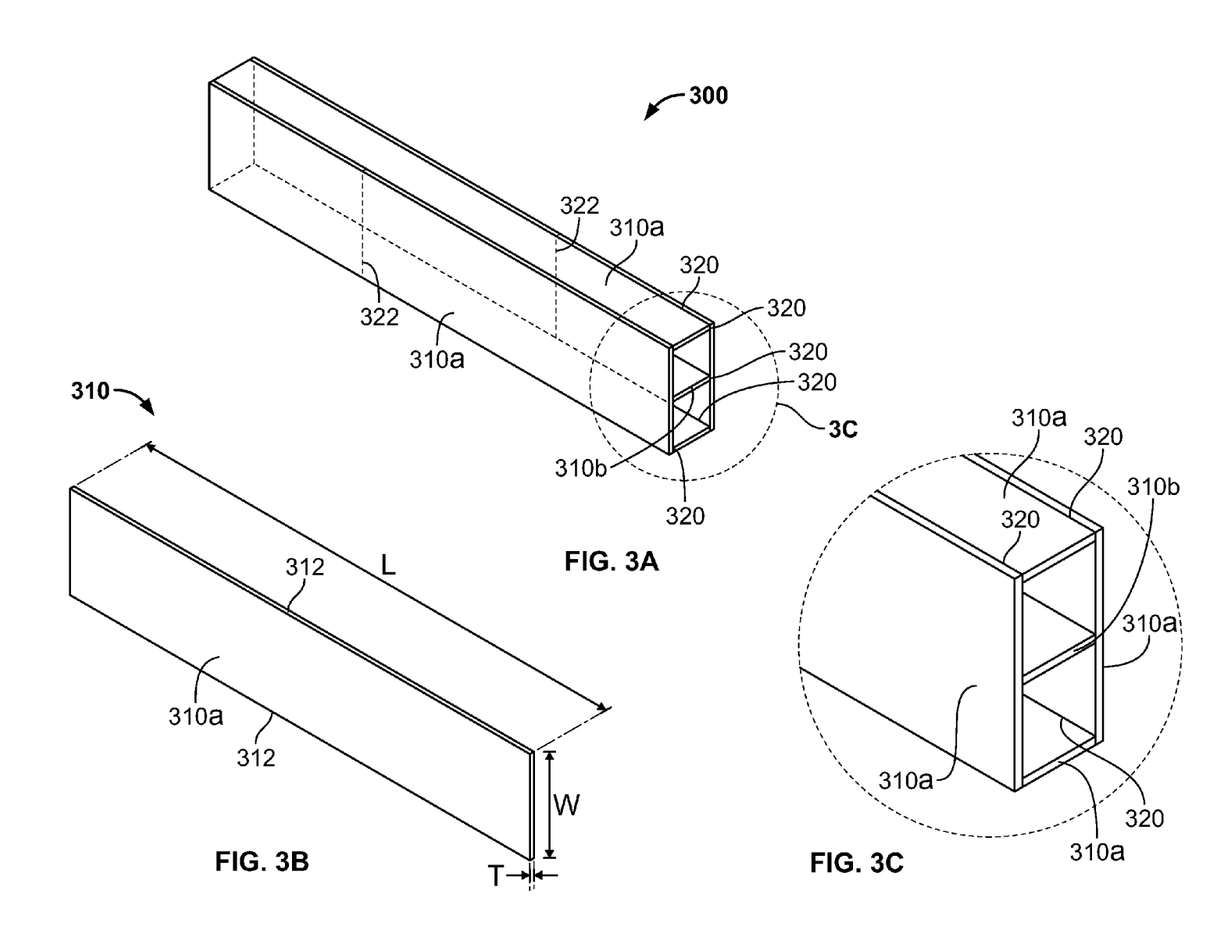
FIG. 3A shows a perspective view of an elongated guideway member of a bridge including a plurality of elongated generally planar web members.
FIG. 3B shows a perspective view of an elongated generally planar web member.
FIG. 3C shows a detailed view of an end of the elongated guideway member

At least one of the guideways of the linear motion machines includes at least one elongated guideway member 300 assembled from a plurality of elongated generally planar web members 310, as shown in FIGS. 3A-3C. In some embodiments, a cross-beam 120 or 220 includes an elongated guideway member 300. Uprights 116 or 118 can also include elongated guideway members 300. In some embodiments, one or more of the base guideways 132 or 232 includes an elongated guideway member 300, which can guide movement of the bridge relative to the base. In some embodiments, the base remains stationary, while in other embodiments the bridge can remain stationary and the base moved in the Y direction. In some embodiments, the carriage 122 or 222 and/or ram 124 can include an elongated guideway member 300. In some embodiments, a linear motion machine can include multiple elongated guideway members 300. The plurality of elongated guideway members 300 can define a plurality of guideways that permit linear motion of an instrument 626 along one or more directions.

A perspective view of an exemplary elongated guideway member 300 is depicted in FIG. 3A. A perspective view of an exemplary elongated generally planar web members 310 is depicted in FIG. 3B. Each elongated generally planar web member 310 has a length L and a pair of opposite side edges 312 running along the length L. Each of the elongated generally planar web members 310 also has a width W and a thickness T. In some embodiments, the thickness T of each elongated generally planar web member 310 is less that 25 mm. In some embodiments, the thickness T of each elongated generally planar web member 310 is less than 20 mm, less than 15 mm, less than 10 mm, or less than 5 mm. In some embodiments, the thickness T of each elongated generally planar web member 310 is at least 0.5 mm. In some embodiments, as shown in FIG. 5E, the elongated generally planar web members 510a can have different thicknesses. The length L can be at least 0.5 m. The length L, in some embodiments, is at least 1 m. In some embodiments, the length L is between 0.5 m and 5 m. In some embodiments, the length is about 1.6 m. The width can be between 5 cm and 50 cm. In some embodiments, the width of each elongated generally planar web member is between 5 and 20 cm. The thickness is the elongated generally planar web member's smallest dimension; the width is the elongated generally planar web member's shortest dimension orthogonal to the direction of the thickness; and the length is the elongated generally planar web member's dimension that is orthogonal to both the thickness's direction and the width's direction. In some embodiments, the elongated generally planar web member is rectangular cuboidal, but other shapes are also contemplated.

Referring back to FIG. 3A, the elongated guideway member 300 is formed of a plurality of elongated generally planar web members. The elongated guideway member 300 can be formed by bonding a plurality of the elongated generally planar web members 310 together at their side edges 312 and along the length L of each elongated generally planar web member 310. As shown, the elongated guideway member 300 can be rectangular cuboidal, but other shapes having at least one generally planar surface are also contemplated. In some embodiments, multiple elongated generally planar web members can be bonded end-to-end at joints 322 to provide longer elongated generally planar web members and thus provide a longer elongated guideway member 300. Multiple joints 322 within a single elongated guideway member 300 can be offset along the length of the elongated guideway member, as shown in FIG. 3A.

Figures 5A, 5B, 5C:
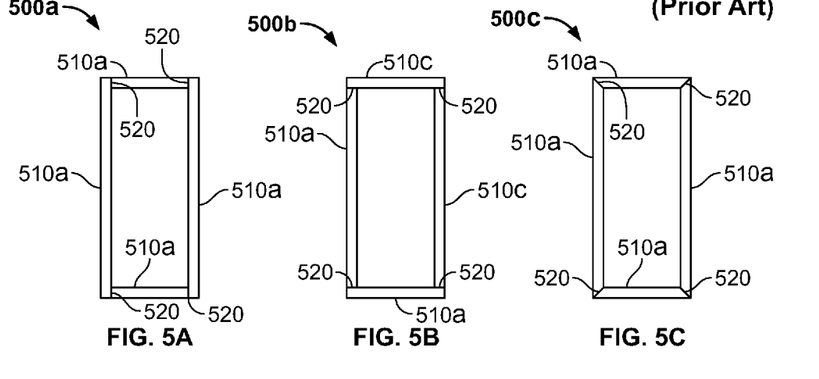
FIGS. 5A-5J show cross-sectional views of different embodiments of an elongated guideway member of a bridge including a plurality of elongated generally planar web members.
Figures 5D, 5E, 5F, 5G, 5H, 5I, 5J, 5K:
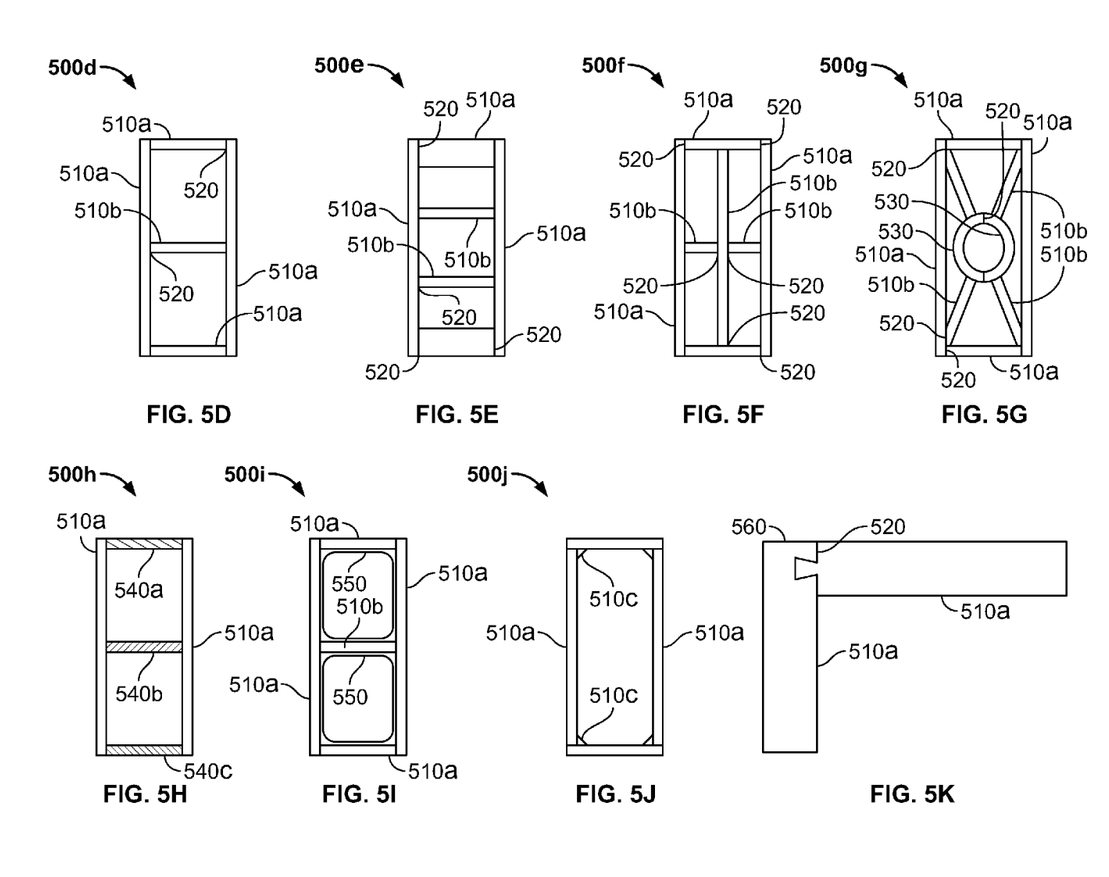
FIG. 5K depicts an embodiment of a method for securing elongated generally planar web members together.

FIGS. 5A-5J depict cross-sectional images of additional exemplary arrangements of various elongated guideway members 500a-500j. FIG. 3A depicts an embodiment including two pairs of parallel planar web members 310a each bonded at opposite side edges, and one internal web member 310b. Each of FIGS. 5A-5J also includes two pairs of parallel planar web members 510a each bonded at opposite side edges. As shown in FIGS. 5A-5C, some embodiments of the elongated guideway member do not include internal elements. Internal elements, however, can provide additional support. FIGS. 3A, 3C, 5D, 5H, and 5I each depict embodiments that have at least one internal elongated generally planar web member 310b, 510b or 540b. In some embodiments, such as shown in FIGS. 5E-5G, multiple internal elongated generally planar web members 510a can be included within the elongated guideway member. Other embodiments, such as those shown in FIGS. 5G and 5J, can include non-planar internal elements 530 or 510c. Internal elements can further increase the stiffness of an outer surface of the elongated guideway member (e.g., a guide surface of the elongated guideway member 300). As shown, internal elongated generally planar web members can have a variety of arrangements, each arrangement producing a different strength profile. By using a plurality of elongated generally planar web members to assemble the elongated guideway member, various arrangements can be produced out of ceramic on short notice without having to wait for the firing of a new structure.

One or more of the elongated generally planar web members of the elongated guideway member includes a ceramic material. In some embodiments, each of the elongated generally planar web members is formed of a ceramic material. The ceramic material can have low coefficients of thermal expansion and a high modulus of elasticity.

For example, the ceramic material can be selected from aluminum oxide ($Al_2O_3$), silicon carbide (SiC), silicon nitride ($Si_3N_4$), a glass like ceramic (e.g., Robax® or Zerodur®) or a combination thereof. For example, the elongated generally planar web members can each be formed of aluminum oxide and have a thickness of between 5 and 20 mm. In another example, the elongated generally planar web members each are formed of silicon carbide and have a thickness of between 0.5 and 5 mm. In some embodiments, the ceramic material is isostatic pressed ceramic. For example, a cold isostatic pressing (CIP) can use an oil-water or air mixture pressurized up to 100,000 psi to form a green body of a desired shape, which is then fired at about 1500° F. and machined to form the final ceramic structure. In other embodiments, the ceramic material can be shaped into a green body by a roll process or by an extrusion process.

Figure 4A:
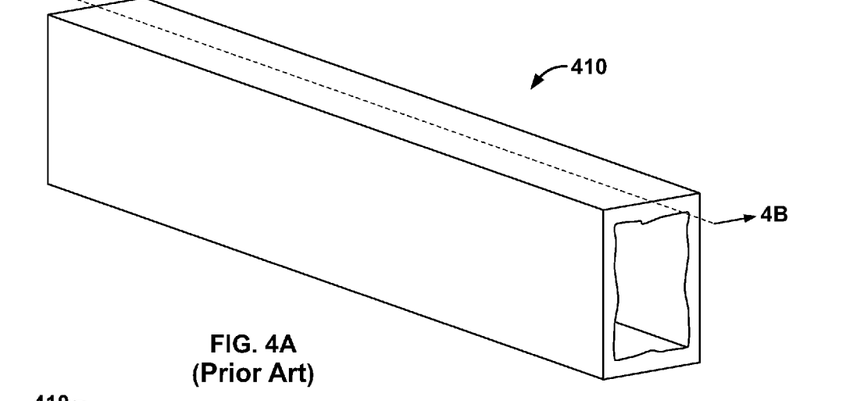
FIG. 4A shows a perspective view of a monolithic elongated guideway member.
Figure 4B:
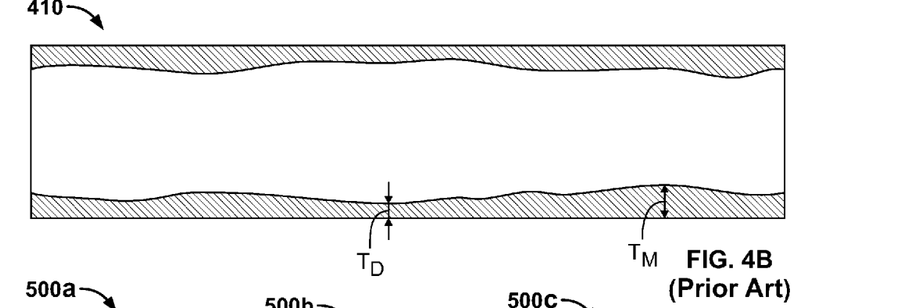
FIG. 4B shows a cross-sectional view of a monolithic elongated guideway member of FIG. 4A long line 4B.

The elongated generally planar web members of isostatic pressed ceramic, however, can be fired at a lower cost with less distortion than an isostatic pressed ceramic monolithic guideway member. The firing of an isostatically pressed ceramic material can result in deformation and warping of the material. The firing process for an isostatic pressed ceramic monolithic guideway member can result in an average shrinkage of between 22 and 25 percent. For example, FIG. 4A depicts a perspective of an example of an isostatic pressed ceramic monolithic guideway member 410. FIG. 4B shows a cross-sectional view of the isostatic pressed ceramic monolithic guideway member 410 along line 4B. The outer surface of fired monolithic guideway member 410 can be machined to create a smooth outer surface, but the inner surfaces are more difficult to machine, thus a varying wall thickness is obtained. Accordingly, the green member of the monolithic guideway member 410 must be CIPed with a wall sufficiently thick in order to ensure the bridge member maintains a minimum of the design wall thickness $T_D$ throughout its structure after firing and machining so that the monolithic guideway member is sufficiently strong over its entire length. Other portions of the monolithic guideway member, however, have a larger wall thickness $T_M$. This excess wall thickness adds additional ceramic material to the monolithic guideway member 410, thus increasing the weight of the structure and increasing the required firing time. For example, the monolithic guideway member 410 composed of aluminum oxide can have a length of 1.64 m, a height of 20 cm, and a width of 7.5 cm, with an average wall thickness of about 25-27 mm, can require a firing time of between 6 and 9 days.

The elongated generally planar web members 310, however, can be extruded and fired with less distortion than the more complex monolithic structure. The elongated generally planar web members are formed by compressing and extruding a ceramic green material followed by firing the green material. The extruded ceramic material can be supported during the firing process, thus reducing the amount of warping during the firing process. Moreover, because the planar web of ceramic is thinner, it can be fired in less time than corresponding monolithic structure (e.g., in about 2-5 days). Moreover, a planar web of ceramic can be fired with an average shrinkage of less than eight percent. The extruded and/or fired ceramic material can be cut to form multiple elongated generally planar web members 310. All sides of the elongated generally planar web members 310 can be easily machined after the firing process, thus removing excess material even along inside surfaces of the elongated guideway member 300. Because of the reduced variations, the elongated guideway members 300 can have substantially constant strength properties over its entire length and thus be designed with smaller tolerances than a corresponding monolithic structure. In some implementations, an elongated guideway member 300 formed of a plurality of generally planar web members 310 can have up to a fifty percent weight reduction when compared to a corresponding monolithic elongated guideway member 410 having the same outer dimensions and made of the same type of ceramic material, yet maintain similar strength properties.

In some embodiments, one or more elongated generally planar web members 310 can include a non-ceramic material. For example, FIG. 5H depicts an embodiment of an elongated guideway member 500h including two ceramic elongated generally planar web members 510a and three metal elongated generally planar web members 540a, 540b, and 540c. The metal elongated generally planar web members can be aluminum, stainless steel, a cobalt-chromium alloy, an iron-nickel alloy (e.g., Invar®), and combinations thereof. In some embodiments, the combination of different materials can permit different materials along different outside surfaces. For example, referring back to FIG. 1, a metal may be present at a surface of cross-beam 120 forming a drive or bearing surface with the carriage 122, while the remainder of the elongated guideway member 300 is formed of ceramic elongated generally planar web members 310. In other embodiments, one or more surfaces can be coated with a non-ceramic material. For example, a metal vapor deposition process can be used to deposit an outer layer of metal onto a drive or bearing surface of the elongated guideway member 300. In other embodiments, one or more elongated generally planar web members can include carbon fiber (e.g., carbon fiber reinforced plastic) to add stability to the elongated guideway member. The combination of different materials can also incorporate functionality into structure. For example, different materials may be combined to integrate optic scales directly into the elongated guideway member 300. In other embodiments, embedded electric conductors and traces can be integrated into the elongated guideway member 300.

A bonding material 320 can be used to secure the elongated generally planar web members together. For example, the bonding material can be epoxy glue, acrylic glue, a soldering material, or a combination thereof. The bonding material can be a UV activated adhesive, such as those used in dentistry. EP460™ sold by 3M of St. Paul, Minn., is an example of a two component epoxy based glue. In some embodiments, a soldering paste can be applied at interfaces between the elongated generally planar web members and can then be heated in a soldering oven to secure the elongated generally planar web members 310 together by forming a soldering strip between the elongated generally planar web members. Thin soldering strips can improve the stiffness of the elongated guideway member 300. In some embodiments, additional structures can be used to create a secure connection between the elongated generally planar web members 310. For example, in some embodiments, an inner layer of a second material can be applied to an inner surface of the elongated guideway member. FIG. 5I, for example, depicts metal inner layers 550 applied to inner surfaces of the elongated guideway member 500i. The metal coating 550 can also provide electro-magnetic shielding. Metal coating 550 may also include embedded conductors and/or multi conductor strips, which may be used in combination with or in place of cables. The bond between elongated generally planar web members 210 can also be used in conjunction with form-fitting elements. In some embodiments, the interface between two elongated generally planar web members 510 can include a dovetail connection. FIG. 5K depicts an example of a dovetail connection 560 between elongated generally planar web members 510.

The cross-beam 120 or 220 can be an elongated guideway member. In some embodiments, other structures (e.g., uprights 116, 118, ram 124, carriage 122) can include one or more elongated guideway members. As discussed above, the elongated guideway member has a lower manufacturing cost due to reduced warping, less distortion, and less grinding work relative to monolithic elongated guideway members. Moreover, the elongated guideway member can have a weight reduction (e.g., 50% or more) as compared to a corresponding monolithic elongated guideway member, which can allow the linear motion machine to move the elongated guideway member (i.e., as the cross-beam) at an increased speed and with an increased acceleration. Increased speed and acceleration can increase the throughput of the linear motion machine. Reduced weight can also reduce the power requirements for operating the linear motion machine. Reduced weight also reduces wear and tear on the drive system(s). Moreover, a reduced weight can make the linear motion machine safer to operate.

Figure 7A:
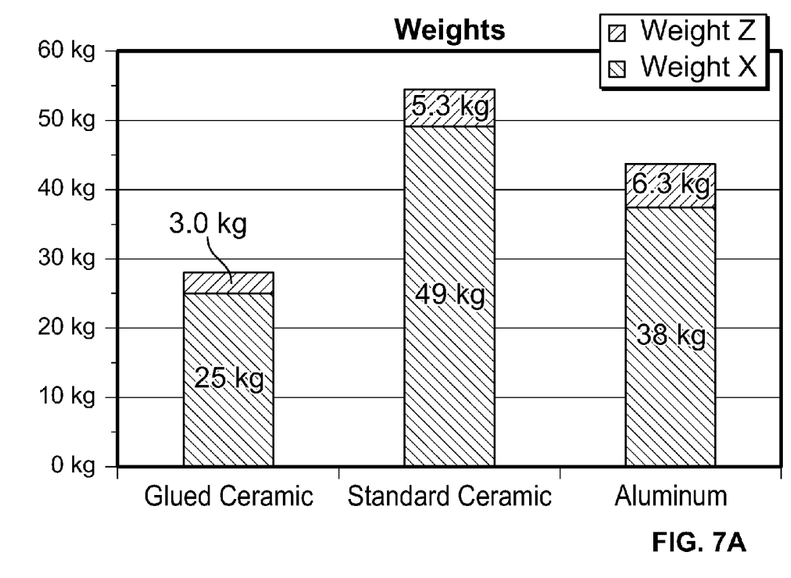
FIGS. 7A and 7B are charts comparing different elongated guideway members.
Figure 7B:
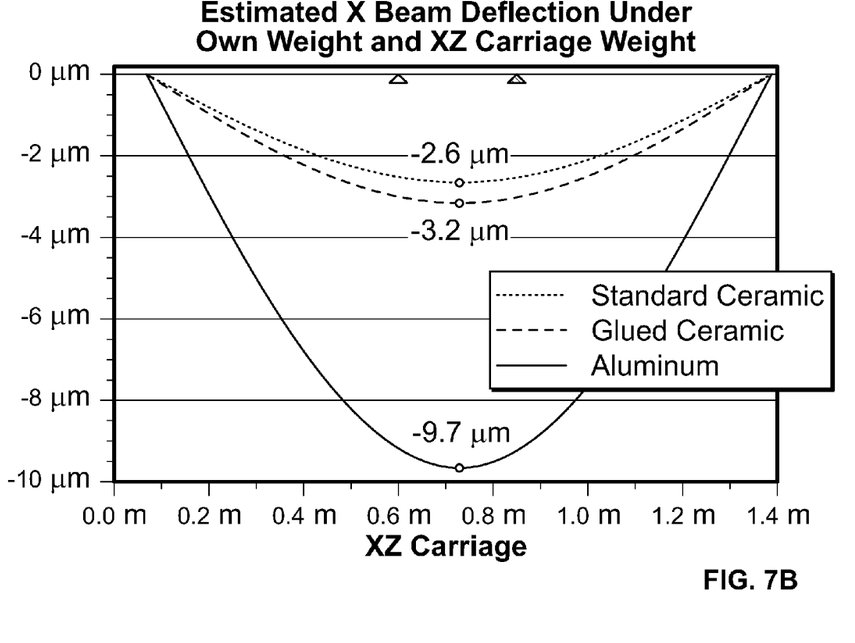

For example, FIGS. 7A and 7B depict comparisons of cross-beams for bridge machines formed of glued ceramic elongated guideway members, monolithic standard ceramic elongated guideway members, and extruded aluminum elongated guideway members. Each elongated guideway member is evaluated as having a height of 20.2 cm and a width of 7.5 cm, with each type having a first length of 120.7 cm and a second length of 151.1 cm. The glued ceramic elongated guideway member had the structure shown in FIG. 5E, with the side and internal elongated generally planar web members having a thickness of 7 mm and the two end piece elongated generally planar web members having a thickness of 15 mm. As shown in FIG. 7A, the weight of the 120.7 cm long glued ceramic elongated guideway member was calculated to be about 25 kg and the 151.1 cm long glued ceramic elongated guideway member was calculated to be about 28 kg. The monolithic standard ceramic elongated guideway member had the structure shown in FIG. 4A and was calculated to have an average wall thickness ranging between 25 and 27 mm. As shown in FIG. 7A, the weight of the 120.7 cm long monolithic elongated guideway member was calculated to be 49 kg and the weight of the 151.1 cm long monolithic elongated guideway member was calculated to be 54.3 kg. The weight of the 120.7 cm long aluminum elongated guideway member was calculated to be 38 kg and the weight of the 151.1 cm long aluminum elongated guideway member was calculated to be 44.3 kg. As shown in FIG. 7B, the estimated amount of beam deflection under its own weight was about −2.6 μm for the monolithic standard ceramic elongated guideway members, about −3.2 μm for the glued ceramic elongated guideway member, and −9.7 μm for aluminum elongated guideway member. Accordingly, the glued ceramic elongated guideway member results in a very similar amount of deflection under its own weight as the monolithic ceramic structure, but has about half the weight.

A prototype bridge-type coordinate measuring machine for testing a glued ceramic elongated guideway member was created by replacing the monolithic ceramic cross-beam structure of a standard coordinate measuring machine with the glued ceramic elongated guideway member having the structure shown in FIG. 5E. Specifically, the side and internal elongated generally planar web members had a thickness of 7 mm and the two end piece elongated generally planar web members having a thickness of 15 mm. The cross-beam had a length of 164 cm, a height of 20 cm, and a width of 7.5 cm. The prototype machine was operated at a linear velocity of 500 mm, which is twice the operating speed of the standard coordinate measuring machine. The detected accuracy of the prototype machine was 1.2 μm+1/400, as compared to the typical accuracy of a standard machine of 1.9 μm+1/250. Accordingly, the light weight construction of the elongated guideway members described herein can increase the speed and acceleration and improve the accuracy as compared to a standard monolithic guideway member and reduce the energy requirements and wear and tear on the drive systems. In some embodiments, the linear motion machine can be operated with accelerations of at least 3 G. For example, the linear motion machine can be operated with accelerations of between 3 and 5 G The elongated guideway member 300 can permit integration of more complex structures into elongated guideway members than that allowed in forming a monolithic elongated guideway member. Specific and unique arrangements can also be assembled from preformed elongated generally planar web members 310 in a short period of time. In some embodiments, the elongated generally planar web members can be assembled into a variable cross section elongated guideway member 300 along the longitudinal axle/center line of the elongated guideway member, which would be difficult to produce in an extruded monolithic elongated guideway member. Moreover, sensors and other electronics used in the bridge machine can be integrated into or located within the elongated guideway member 300. Safety components can also be incorporated into the elongated guideway member 300. In some embodiments, air duct passages (e.g., holes or slots in the elongated generally planar web members 310) for heat management are integrated into the elongated guideway member 300.

Figure 6A:
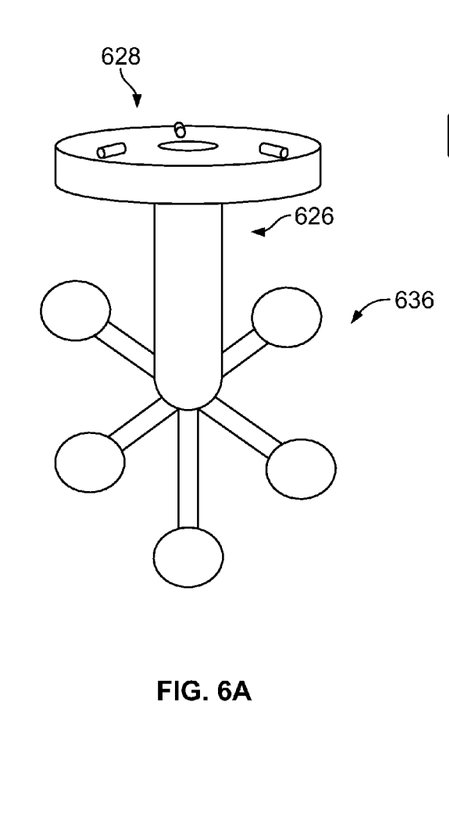
FIG. 6A shows an example of a measuring instrument for a coordinate measuring machine.
Figure 6B:
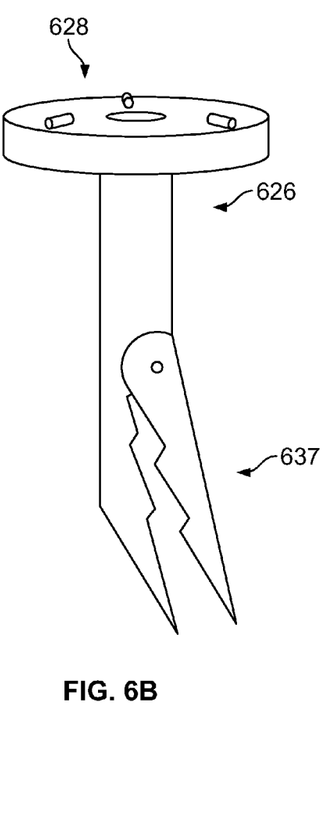
FIG. 6B shows an example of a grasping instrument for a pick-and-place machine.
Figure 6C:
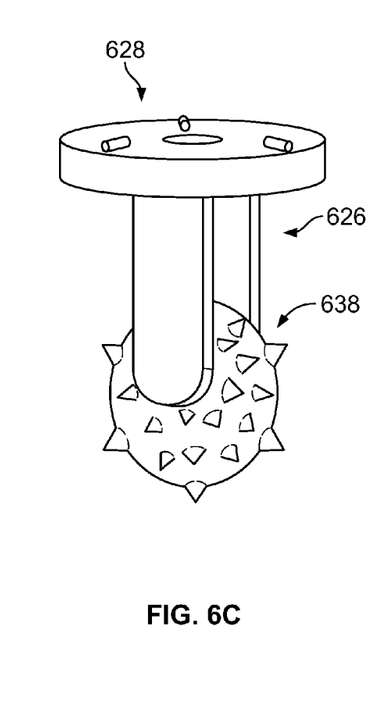
FIGS. 6C and 6D show examples of grinding instruments for a machine tool.
Figure 6D:
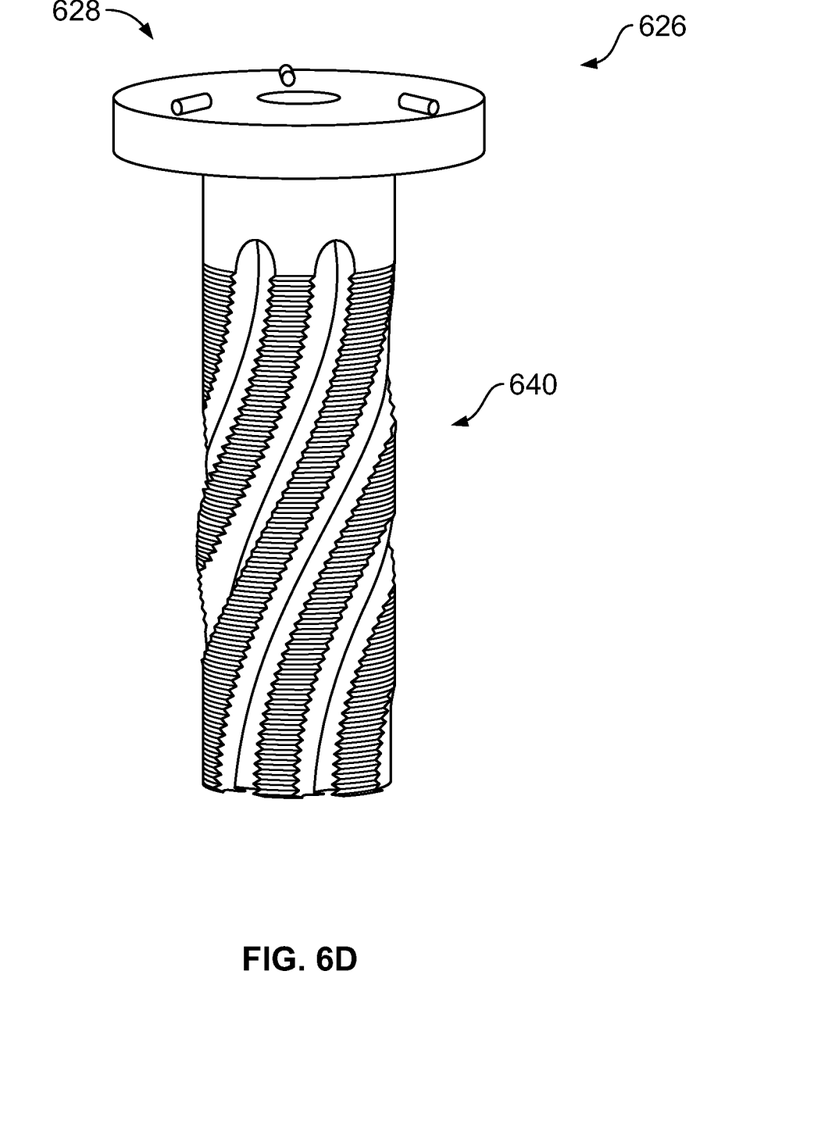

The elongated guideway member 300 can be used in a number of different types of linear motion machines. Linear motion machines can include coordinate measuring machines, machine tools, pick and place machines, and robotics. Referring back to FIGS. 1 and 2, instrument 626 can have a number of different functions. Moreover, multiple instruments can also be included on the carriage 122 or 222. Instrument 626 is connected to the carriage via ram 124. The instrument 626 is adapted to measure or manipulate any work pieces positioned on the base 112 or 212. As shown in FIGS. 1 and 2, the linear motion machines can be coordinate measuring machines. For example, a coordinate measuring machine can include the stylus 636 shown in FIG. 6A. In other embodiments, the linear motion machine includes a grasping instrument 637, such as that shown in FIG. 6B. In still other embodiments, the linear motion machine can include a material removing instrument 638, such as that shown in FIGS. 6C and 6D. Other material removing instruments can include cutting blades and lasers. Different instruments 626 can be attached to a ram 124 via an attachment interface 628, which can permit control of the instrument. Still other embodiments can include still other instruments, such as printing instruments, adhesive dispensing instruments, laser cutting instruments, water jet instruments, and welding instruments.

Referring again to FIGS. 1 and 2, the linear motion machines can also include a control and evaluation units 144 or 244, which are designed to actuate the drives of the bridge machine 100 or gantry-type machine 200 so that the instrument 626 travels to desired locations. For example, for a coordinate measuring machine, instrument 626 can be moved to a desired measurement location. For manual operation, the control unit 144 or 244 may be connected to a user console 146 or 246. It is also possible for the control unit 144 or 244 to fully automatically control the movement and operation of the instrument 626. The control unit 144 or 244 contains a processor 148 or 248 and a plurality of memories, which are represented here by the reference numerals 150 or 250 and 152 or 252 for the sake of simplicity. A computer program is stored in the memory 150 or 250. In some embodiments, static difference values that have been determined in a calibration run are permanently stored in the memory 152 or 252.

A number of embodiments have been described. Nevertheless, it will be understood that various modifications may be made without departing from the spirit and scope of this document.

What is claimed is:

1. A linear motion machine, comprising:
a base having an upper surface configured to support one or more work pieces; and
an instrument mounted to the base via a plurality of guideways permitting movement of the instrument relative to the base along three axes, the instrument being configured to measure or manipulate items supported on the base;
wherein at least one of the plurality of guideways comprises an elongated guideway member comprising a plurality of elongated generally planar web members, each of the elongated generally planar web members having a length, a width, a thickness, and a pair of opposite side edges running along the length, wherein the length is substantially greater than the width and the width is substantially greater than the thickness for each of the elongated generally planer web members, the plurality of elongated generally planar web members being separately formed and subsequently bonded together at least at one or more of the side edges, one or more of the elongated generally planar web members comprising a ceramic material, wherein the elongated guideway member has a rectangular cross-section including two parallel pairs of parallel planar web members each bonded at opposite side edges to the other pair of parallel planar web members.

2. The linear motion machine of claim 1, wherein the elongated guideway member is configured for movement relative to the base.

3. The linear motion machine of claim 2, wherein the elongated guideway member is a cross-beam suspended via one or more uprights over the base parallel to the upper surface, wherein a carriage is movably mounted on the cross-beam and the instrument is movably mounted to the carriage.

4. The linear motion machine of claim 2, wherein the elongated guideway member is an upright extending orthogonal to the upper surface.

5. The linear motion machine of claim 2, wherein the elongated guideway member is a guideway permitting the instrument to move orthogonal to the upper surface.

6. The linear motion machine of claim 1, wherein the elongated guideway member comprises at least one internal elongated generally planar web member positioned between each of the two pairs of parallel planar web members.

7. The linear motion machine of claim 1, wherein a bond between the plurality of elongated generally planar web members comprises an epoxy adhesive, an acrylic adhesive, or a soldering material.

8. The linear motion machine of claim 1, wherein the ceramic material comprises isostatically pressed ceramic material.

9. The linear motion machine of claim 1, wherein each of the elongated generally planar web members comprises a ceramic material, wherein the ceramic material is selected from the group consisting of aluminum oxide, silicon carbide, silicon nitride, glass-like ceramics, and combinations thereof.

10. The linear motion machine of claim 1, wherein one or more elongated generally planar web members comprise a metal material.

11. The linear motion machine of claim 1, wherein the linear motion machine is a coordinated measuring machine and the instrument is adapted to measure items supported on the base, a machine tool and the instrument is adapted to remove material from items supported on the base, or a pick-and place machine and the instrument is adapted to secure, move, and release items supported on the base.

12. A method of using the linear motion machine, comprising placing one or more work pieces on a base of a linear motion machine, the base having an upper surface configured to support the one or more work pieces, the linear motion machine further comprising an instrument mounted to the base via a plurality of guideways permitting movement of the instrument relative to the base along three axes, the instrument being configured to measure or manipulate items supported on the base, wherein at least one of the plurality of guideways comprises an elongated guideway member comprising a plurality of elongated generally planar web members, each of the elongated generally planar web members having a length, a width, a thickness, and a pair of opposite side edges running along the length, wherein the length is substantially greater than the width and the width is substantially greater than the thickness for each of the elongated generally planer web members, the plurality of elongated generally planar web members being separately formed and subsequently bonded together at least at one or more of the side edges, one or more of the elongated generally planar web members comprising a ceramic material, wherein the elongated guideway member has a rectangular cross-section including two parallel pairs of parallel planar web members each bonded at opposite side edges to the other pair of parallel planar web members; and measuring or manipulating the one or more work pieces with the instrument.

* * * * *

UNITED STATES PATENT AND TRADEMARK OFFICE
CERTIFICATE OF CORRECTION

| | | |
|---|---|---|
| PATENT NO. | : 9,109,747 B2 | Page 1 of 1 |
| APPLICATION NO. | : 13/935048 | |
| DATED | : August 18, 2015 | |
| INVENTOR(S) | : Josef Schernthaner | |

It is certified that error appears in the above-identified patent and that said Letters Patent is hereby corrected as shown below:

In the specification,

Col. 4, line 22, delete "member" and insert -- member. --.

Col. 5, line 55, delete "that" and insert -- than --.

Col. 6, make the paragraph beginning on line 59 a continuation of the paragraph on line 58.

Col. 10, line 3, delete "5 G" and insert -- 5 G. --.

Signed and Sealed this
First Day of March, 2016

Michelle K. Lee
*Director of the United States Patent and Trademark Office*